May 20, 1952  J. J. LUCAS  2,597,648
MACHINE FOR FORMING CUTTERS
Filed Feb. 27, 1950  6 Sheets-Sheet 1

INVENTOR.
James J. Lucas
BY
ATTORNEYS

May 20, 1952 J. J. LUCAS 2,597,648
MACHINE FOR FORMING CUTTERS
Filed Feb. 27, 1950 6 Sheets-Sheet 2

INVENTOR.
James J. Lucas
BY
ATTORNEYS

May 20, 1952 J. J. LUCAS 2,597,648
MACHINE FOR FORMING CUTTERS
Filed Feb. 27, 1950 6 Sheets-Sheet 4

INVENTOR.
James J. Lucas
BY
ATTORNEYS

INVENTOR.
James J. Lucas

May 20, 1952  J. J. LUCAS  2,597,648
MACHINE FOR FORMING CUTTERS

Filed Feb. 27, 1950  6 Sheets-Sheet 6

INVENTOR.
James J. Lucas
BY
ATTORNEYS

Patented May 20, 1952

2,597,648

UNITED STATES PATENT OFFICE 2,597,648

MACHINE FOR FORMING CUTTERS

James J. Lucas, Rockford, Ill., assignor to Barber-Colman Company, Rockford, Ill., a corporation of Illinois Application February 27, 1950, Serial No. 146,519

11 Claims. (Cl. 51—123)

This invention relates to the formation or sharpening of rotary spiral gash milling cutters, particularly those in which the angularly spaced cutter teeth extend longitudinally of the rotational axis and the contour of the cutter tapers along this axis.

The primary object is to provide a novel machine for producing tooth faces of constant lead in a tapered milling cutter of the above character.

A more detailed object is to provide in a machine of the above character a novel mechanism for automatically adjusting the work and tool supports relative to each other about the line of contact between the tool and the face of the cutter tooth being operated on whereby to maintain this line of contact fixed in the different positions of engagement between the cutter and the tool in spite of the changes in the helix angle of the tooth face.

The invention also resides in the novel structural character of the automatic adjusting means above referred to.

Other objects and advantages of the invention will become apparent from the following detailed description taken in connection with the accompanying drawings, in which Figure 1 is a fragmentary front elevational view of a cutter sharpening machine embodying the novel features of the present invention.

Fig. 2 is a diagrammatic view illustrating the relation of the cutter and grinding tool in different relative positions of the two in the course of sharpening one cutter tooth.

Figs. 3 and 4 are fragmentary sectional views taken substantially along the lines 3—3 and 4—4 respectively of Fig. 1.

Figs. 5 and 6 are fragmentary plan sections taken respectively along the lines 5—5 and 6—6 of Fig. 3.

Figure 1:
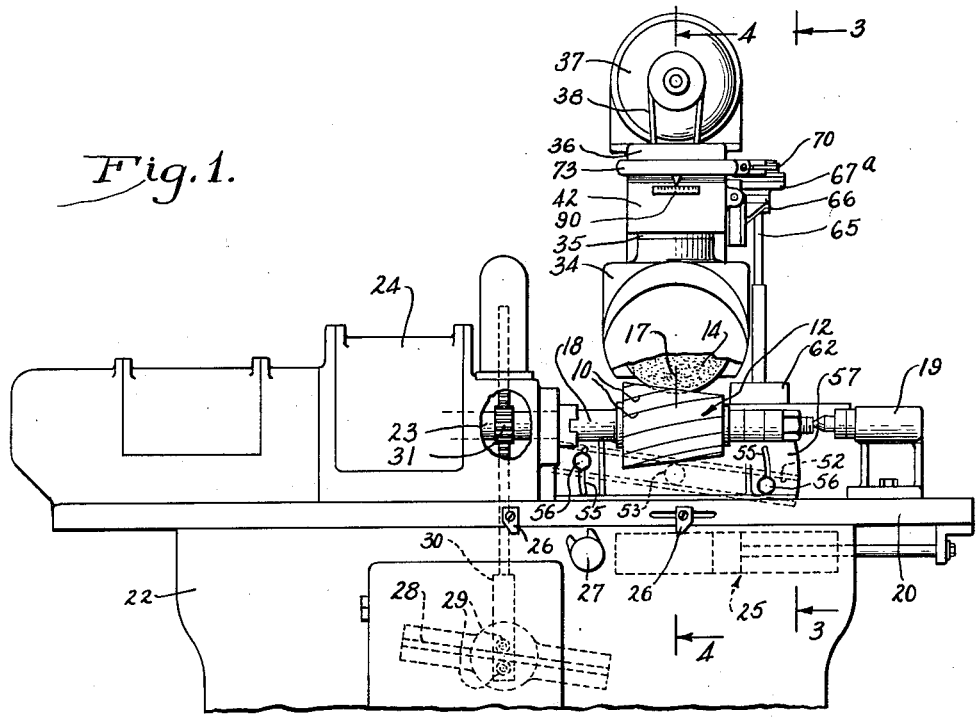

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

Figure 2:
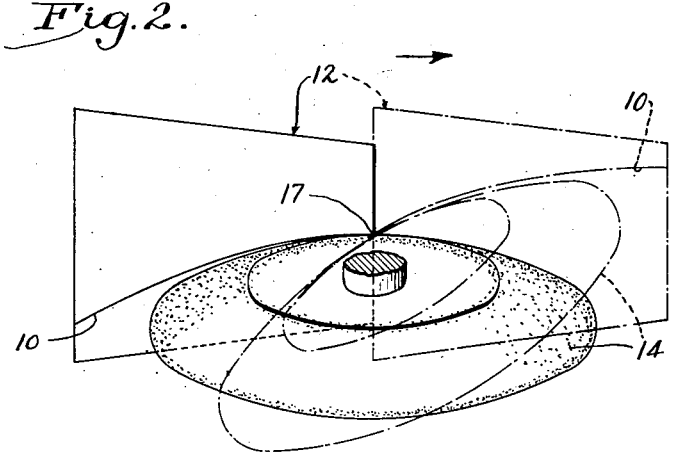

For purposes of illustration, the invention is shown on the drawings incorporated in a machine for removing metal from the cutting faces 10 on the teeth 11 of a milling cutter 12 which tapers longitudinally of its rotational axis and is of generally frustoconical external contour. Each gash 13 is spiraled around the axis at a helix angle which as shown in Fig. 2 increases progressively from the smaller to the larger end of the cutter so that at all points along the length of the tooth face, the lead is the same, that is, for a given axial length of the cutter, the cutting edge progresses around the axis through a fixed angular distance.

Metal is removed from the tooth faces one at a time by means of a rotary grinding wheel which may be of the so-called pencil type but which preferably comprises a disk 14 having an active peripheral face 15 of shallow frustoconical contour. With the surface 15 lying in tangential contact with the face of a tooth 11, engagement of the two will occur along a line 17 (Figs. 1 and 2) lying on the grinding surface.

While being sharpened, the cutter 12 is mounted on an arbor 18 supported at one end by a tail stock 19 upstanding from a horizontal table 20 which is slidable along ways 21 of the machine bed 22. The other end of the arbor is supported by and coupled to a spindle 23 journaled in an index head 24 of well known construction incorporating suitable means for feeding the cutter tooth toward the wheel in successive fine increments after each table stroke or abutment thereof.

Figure 3:
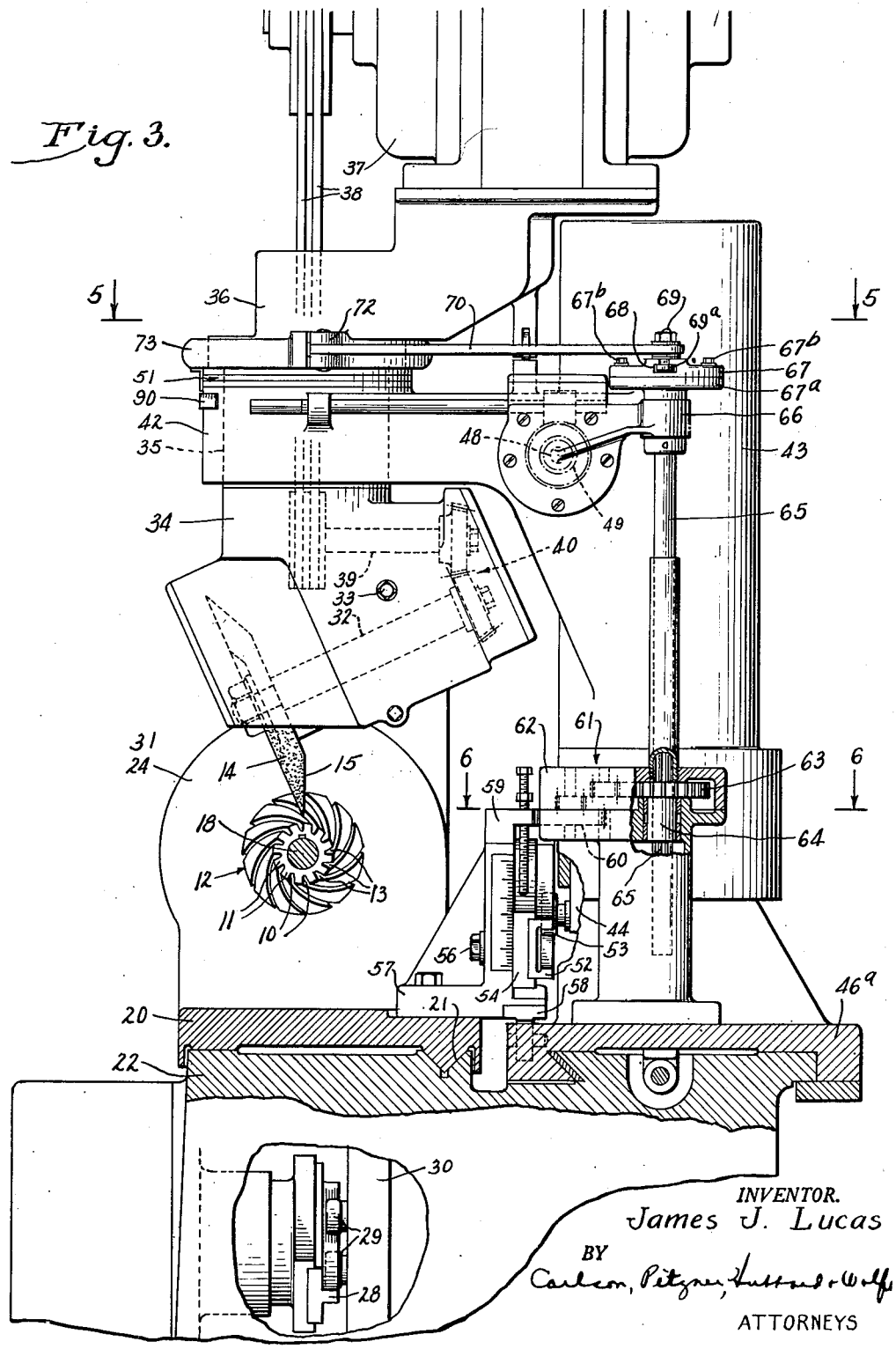
Figure 9:
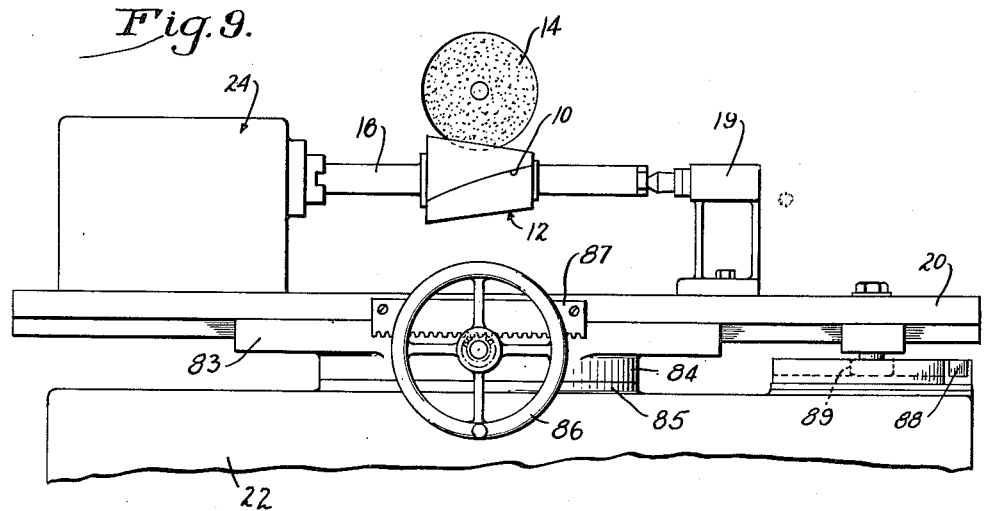
Fig. 9 is a fragmentary front elevational view of the machine shown in Fig. 8.

Reciprocation of the table to pass one tooth of the cutter back and forth across the wheel face 15 may be effected manually as shown in Fig. 9 or by a hydraulic actuator 25 (Fig. 1) whose stroke is determined in a well known way by spaced dogs 26 on the table operating in conjunction with the actuator 27 of the usual reversing valve. During successive strokes of the table, the arbor 18 is turned back and forth in accordance with the constant lead of the cutter face 10. This may be accomplished for example by a cam bar 28 (Figs. 1 and 3) secured to the machine bed 22 and inclined relative to the horizontal at an angle corresponding to the lead to be imparted to the cutter tooth. On opposite sides, the bar 28 is engaged by rollers 29 on a vertical follower rod 30 having rack teeth along its upper end meshing with a pinion 31 on the spindle 23.

The grinding wheel 14 is fast on the outer end of a spindle 32 which is adjustable axially by turning a shaft 33 and is journaled in a bracket 34 rigidly joined by a cylindrical spacer or shaft 35 to an upper bracket 36 supporting an electric motor 37 for driving the grinding wheel. The drive is through pulleys and belts 38 to a shaft 39 journaled in the lower bracket 34 and connected by bevel gears 40 to the wheel spindle 32. The latter is inclined downwardly and transversely of the cutter arbor 18 at an angle such as to locate the wheel surface 15 for contact with the tooth face 10 along the line 17 which intersects the rotational axis of the cutter and coincides with the axis of the shaft 35. In the present instance this line is substantially vertical.

The shaft 35 connecting the brackets 34 and 36 projects through and is journaled in a vertical bearing 41 on the forward end of an arm 42 integral with and projecting horizontally from the upper end of a sleeve 43 secured to internal gibs 44 and 45 which slide in ways on the exterior of a vertical post 46. The latter is supported on the rear part of the machine bed 22 and is adjustable along horizontal ways 47 extending parallel to the path of reciprocation of the work table 20. A shaft 48 on the arm 42 is rotatable by suitable means and carries a pinion 49 meshing with rack teeth on the gib 44 thereby enabling the arm 42 and therefore the wheel supporting head to be adjusted vertically. A downwardly facing shoulder 50 at the upper end of the shaft 35 rests on an antifriction thrust bearing 51 supported on the upper end of the shaft bearing 41. The grinding wheel head is thus adapted to swivel freely about the vertical axis of the shaft 35 which extends across the wheel face 15 along the line of engagement between this face and the face 10 of the cutter tooth being sharpened.

Figure 4:
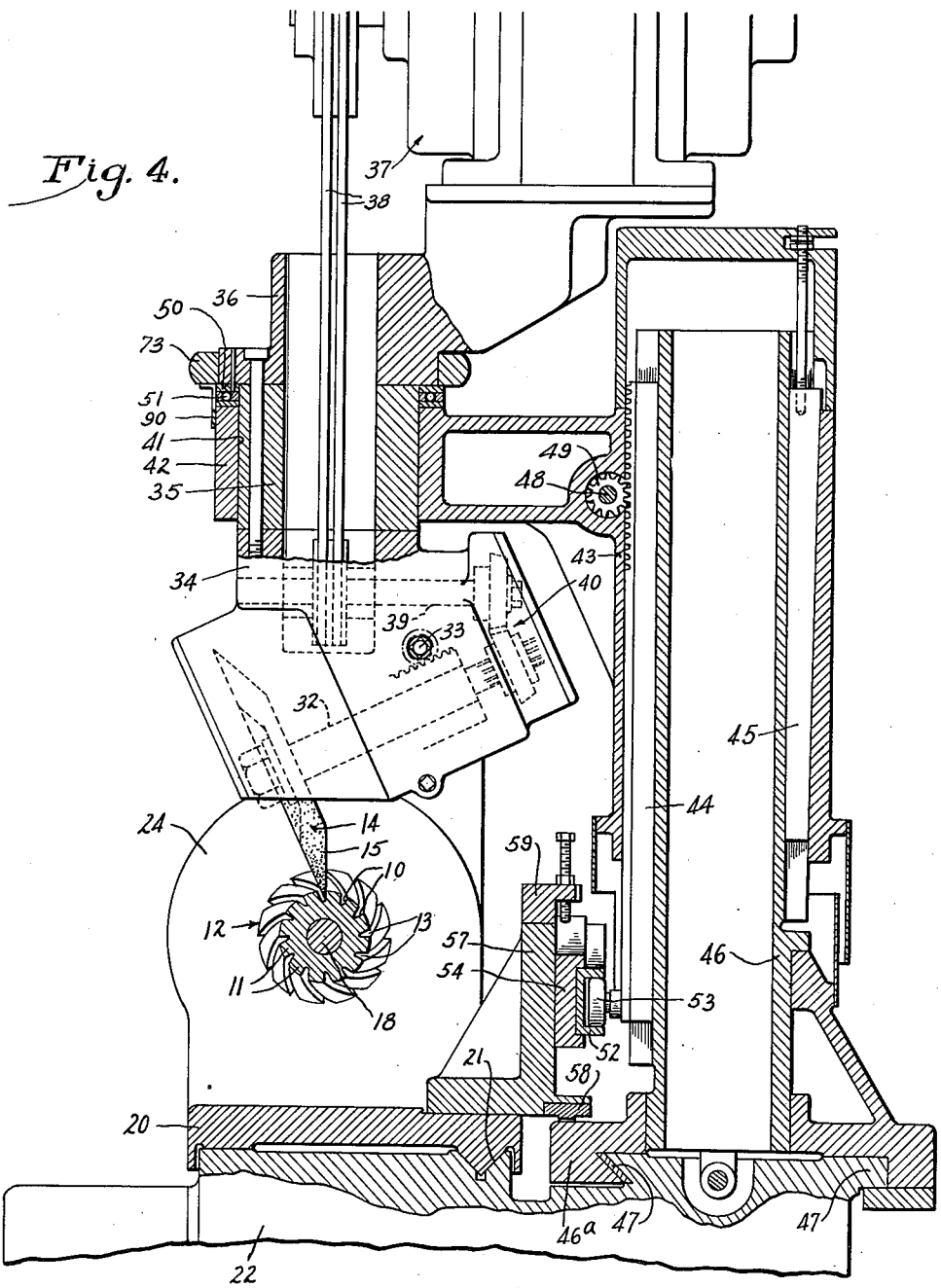
Figure 5:
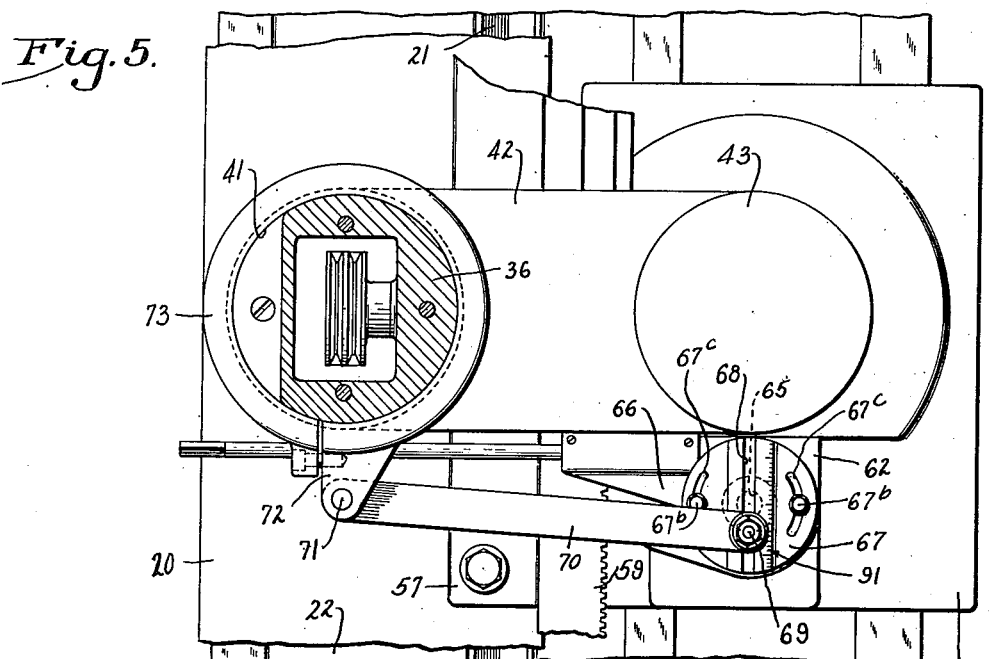

The cutter is raised and lowered in timed relation to the successive strokes of the table 20 so that the wheel surface follows the taper of the cutter and is maintained in proper engagement across the entire vertical width of the tooth face 10. Herein, the motion of the work table is utilized for this purpose through the medium of a cam bar 52 carried by the table 20 and engaging a follower roller 53 mounted on a stud which is rigid with and projects forwardly from the lower end portion of the gib 44. The cam bar is in the form of a channel rigid with a plate 54 which carries bolts 56 which extend through slots 55 in a bracket 57 and by which the plate may be clamped to the bracket 57 (Figs. 3 and 4) with the channel inclined at a selected angle corresponding to the taper of the cutter. The bracket rests on and is bolted to the rear edge of the table 20 with an overhanging portion of the bracket supported by rollers (Fig. 3) supported on the base 46ª of the column 46.

Figure 6:
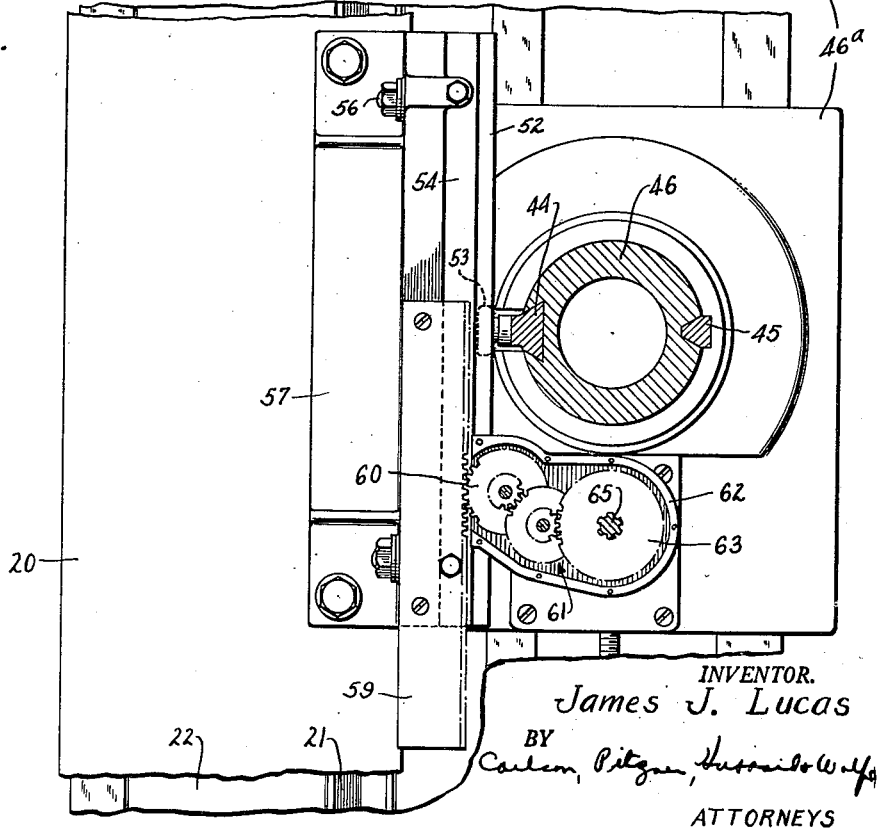

In accordance with the present invention, provision is made for relatively swiveling the grinding wheel and the cutter being sharpened about the line 17 of contact between the two and in synchronism with the reciprocatory or sharpening motion so as to maintain the wheel face 15 tangent at all times to the tooth face 10 being ground while at the same time maintaining the line of contact in a fixed position. In the form shown in Figs. 1 to 6, such automatic swiveling adjustment is effected by transmitting the motion of the table 20 at a reduced rate to the shaft 35 so as to oscillate the wheel supporting head 34 back and forth between positions shown in full and in phantom in Fig. 2 during engagement of the wheel and tooth face as the table moves through its opposite strokes. One form which the transmitting connections may take includes a horizontal rack bar 59 (Figs. 3, 4, and 6) secured to the top of the table bracket 57 and meshing with the initial gear 60 of a train 61 journaled in a housing 62 rigid with the column base 46ª. The terminal gear 63 is on a sleeve 64 spline coupled to the lower end portion of a shaft 65 which extends upwardly along the column 46 and at its upper end is journaled in a bearing 66 on the side of the arm 42 which supports the grinding wheel assembly.

Fast on the upper end of the shaft 65 is a disk 67ª lying against a crank disk 67 having a diametrical T-slot 68 therein in which the head 69ª of a pivot pin 69 may be clamped with the pin spaced different selected distances from the shaft axis according to the range of oscillation to be imparted to the grinding wheel assembly. The two disks 67 and 67ª are normally clamped together by screws 67ᵇ secured to disk 67ª and extending through arcuate slots 67ᶜ in the disk 67. After loosening of the screws, the disk 67 may be turned relative to the disk 67ª and the rockshaft 65.

The pivot pin 69 is connected to one end of a link 70 whose other end is pivoted at 71 to the end of an arm 72 projecting outwardly from a split ring 73 clamped around and made rigid with the bracket 36 and upper end portion of the shaft 35 bolted thereto. Thus the latter shaft and the wheel head thereon are oscillated back and forth in synchronism with the strokes of the work table 20, the direction of each motion corresponding to the direction of the lead on the cutter tooth being sharpened.

The machine as described above is set up as follows preparatory to sharpening a given cutter after mounting thereof on the table 20 followed by adjustment of the dogs 26 and the cam bars 28 and 52 to produce a table stroke of the desired length, angular turning of the cutter to correspond to the lead of the tooth face, and vertical movement of the grinding wheel to correspond to the longitudinal taper of the cutter. The drive connection for turning the grinding wheel assembly within the vertical bearing 41 is disabled by loosening the clamping ring 73 and by shifting the pivot pin 69 along the slot 68 until it is alined with the center of the shaft 65.

The table is moved endwise until the longitudinal center of the cutter is disposed in a vertical plane including the axis of the grinding wheel. Then, by reference to a scale 90 (Figs. 1 and 3) and a coacting pointer, the wheel assembly is turned within the bearing 41 and positioned precisely at the center of the angle through which the assembly is to oscillate. The clamp 73 is then tightened to connect the assembly to the link 70 whereupon the wheel surface 15 will be adapted for engagement with the face 10 of the cutter tooth along the line 17 which coincides with the axis of oscillation of the wheel head.

Next, the pin 69 is loosened and shifted out along the T-slot 68 a distance measured by reference to a scale 91 (Fig. 5) along the slot and corresponding precisely with the change of the helix angle of the given cutter tooth per unit distance along the cutter axis. As an incident to this adjustment, the wheel assembly is turned away from the original setting above referred to. To reestablish this setting, the disks 67 and 67ª are disconnected by loosening the screws 67ᵇ and turning the entire wheel assembly until the pointer on the split ring 73 reaches the original set position along the scale 90. The screws 67ᵇ then are retightened. By adjustment of the shafts 33 and 48, the grinding wheel may now be lowered into one of the cutter gashes and advanced axially to bring the face 15 into contact with the tooth face 10 along the line 17.

After these set-up adjustments have been made, the drive connection between the table 20 and the wheel head will be conditioned to oscillate the wheel back and forth between the positions shown in full and in phantom in Fig. 2 during which the full length of the tooth face is moved across the wheel surface. By virtue of this automatic swiveling in synchronism with the table reciprocations, the line 17 of contact between the wheel and the tooth face remains fixed for all positions of the table and alined with the axis of operation of the wheel head. The wheel face is thus maintained in proper tangential relation to the tooth face at all times in spite of the progressive variation in the helix angle of the tooth face necessitated by the constant lead of the axially tapered tooth face. That is to say, the increment of swiveling of the wheel support for a given motion of the table 20 corresponds precisely to the angular progress of the tooth face around the cutter axis in the same table movement. As a result, the wheel face is at all times disposed in the proper relation to the tooth face and the swiveling adjustment is timed properly with respect to the relative angular and vertical adjustments between the cutter and the grinding wheel as produced by the action of the cam bars 28 and 52.

Figure 7:
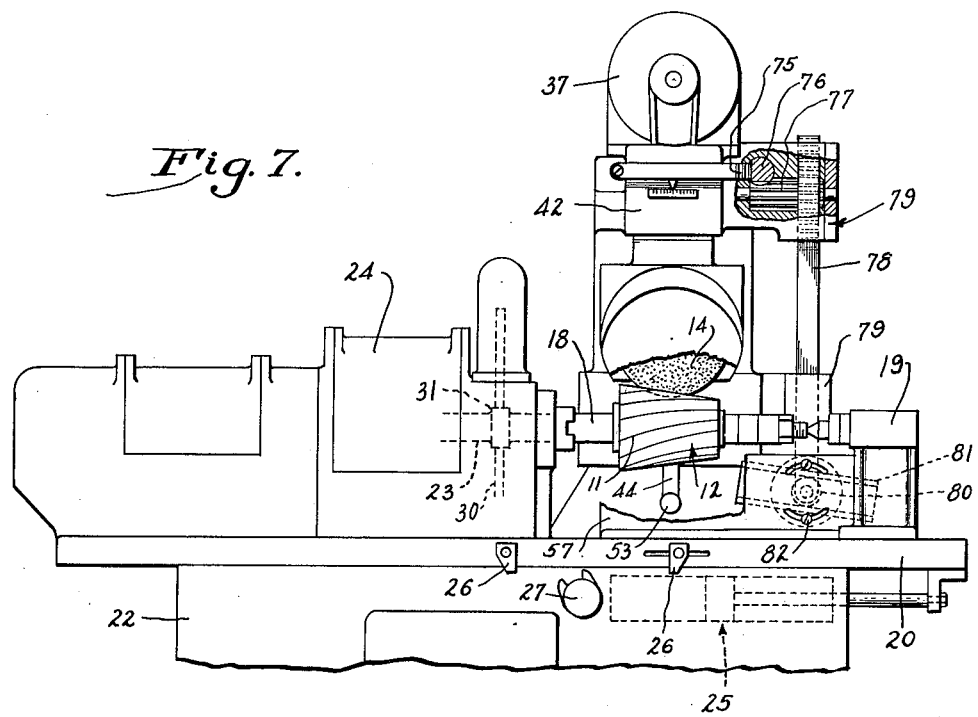
Fig. 7 is a schematic front elevational view of a modified form of the cutter sharpening machine.

Fig. 7 illustrates another way in which the motion of the work table may be utilized to effect the desired oscillation of the grinding wheel. In this case the split ring 73 of the grinding wheel assembly is formed with external spur teeth 75 which mesh with teeth on a rack bar 76 mounted on the wheel supporting arm 42 for endwise reciprocation transversely of the table 20. Other teeth along the lower edge of this bar mesh with a pinion 77 also journaled on the arm 42 and meshing with a vertical rack bar 78 which is slidable in guides 79 on the sleeve 43. At its lower end, the bar 78 carries a follower roller 80 which rides in the channel of a cam bar 81. Through screws 82, the bar is clamped to the bracket 57 on the work table 20 and may be adjusted to any inclination by virtue of the slots through which the clamping screws 82 project. In this case, the inclination of the bar 78 would be somewhat greater than that required to produced the desired oscillation of the wheel assembly. The difference will be sufficient to compensate for the vertical movement of the wheel assembly which is produced by the cam bar 52 previously described for causing the wheel to follow the taper of the cutter. As before, provision would be made for disengaging the gear elements or otherwise breaking the motion transmitting connection between the wheel assembly and the cam 81 so as to permit initial setting up of the machine following the general procedure described above.

Figure 8:
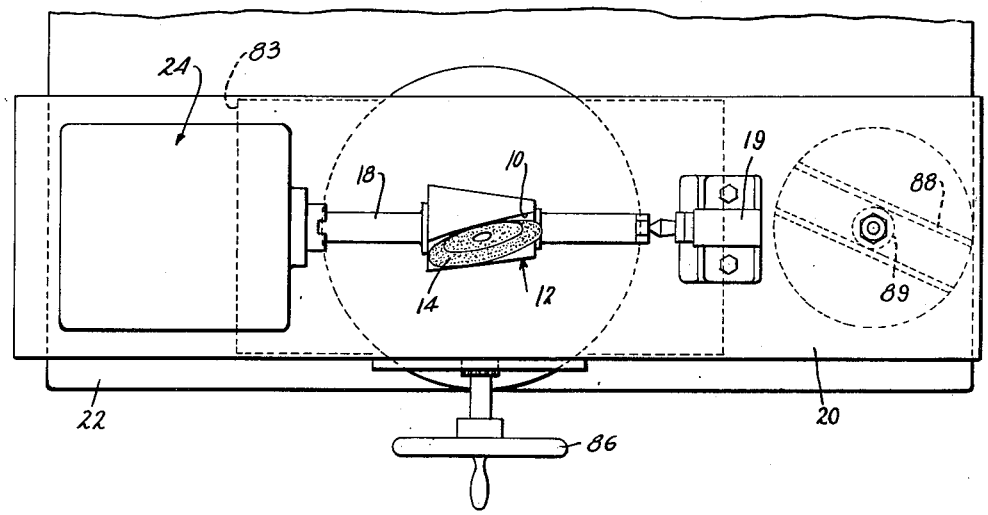
Fig. 8 is a fragmentary plan view of the cutter support and the grinding wheel in another modification.

Instead of oscillating the wheel support to maintain the line 17 of the wheel contact fixed throughout the table strokes, the work table 20 itself may be turned relative to the bed 22 about a vertical axis coincident with this line of contact. For this purpose, the table guideways 21 are formed on a sub-table 83 (Figs. 8 and 9) resting on the bed 22 and having a reduced lower end portion 84 journaled in a bearing 85 on the bed. In this form, the table is arranged to be reciprocated manually by turning a hand wheel 86 carrying a pinion which is journaled on the sub-table and meshes with a rack bar 87 on the side of the reciprocating table 20.

The reciprocatory motion of the table 20 is converted into the proper oscillatory motion of the entire table assembly by the action of a channel-shaped cam bar 88 adjustably fixed to the machine bed 22 beneath the right-hand end of the table 20. A follower roller 89 projecting from the underside of the table 20 rides in the cam channel which is inclined at the proper angle to impart the desired degree of oscillatory motion to the cutter during its endwise reciprocation, its rotation by the cam bar 28, and the relative vertical movement between the wheel and cutter by he cam bar 52, the same as in the form of the machine first described.

I claim as my invention:

1. A machine for forming spiral teeth of substantially constant lead on a longitudinally tapering rotary cutter, said machine having, in combination, a cutter support, means on said support mounting said cutter for rotation about the cutter axis, a support carrying a rotatable grinding wheel for engagement of a peripheral surface thereon with the face of one said cutter teeth, means mounting said supports for relative reciprocation along said cutter axis and for relative movement along a path extending transversely of the cutter axis, mechanism for effecting such reciprocation, for simultaneously turning the cutter about said axis, and for relatively moving said supports along said path in accordance with the changing helix angle and taper of the cutter tooth, means supporting said wheel support to swing about an axis coincident with the line of contact between said wheel and the engaged tooth face of said cutter, a rockshaft journaled on the machine frame, a gear connection between said shaft and the movable one of said supports operable to oscillate said shaft back and forth in unison with the reciprocation of the support, and a connection between said rockshaft and said wheel support operable to oscillate the latter progressively in directions and through distances such as to maintain said line of contact fixed in all positions of the reciprocable support.

2. A machine for forming spiral teeth of substantially constant lead on a longitudinally tapering rotary cutter, said machine having, in combination, a frame, a table reciprocable on said frame, means on said table mounting said cutter for rotation about the cutter axis, a support movable toward and away from said table along a path extending transversely of said axis, a grinding wheel rotatably mounted on said support for engagement of a peripheral surface thereon with the face of one of said cutter teeth, mechanism for reciprocating said table, for simultaneously turning the cutter about said axis, and for moving said support along said path in accordance with the changing helix angle and taper of the cutter tooth, means supporting said wheel support to swing about an axis coincident with the line of contact between said wheel and the engaged tooth face of said cutter, a rockshaft journaled on said frame, a connection between said table and said rockshaft operable to oscillate the latter back and forth in unison with the table strokes, and a connection between said rockshaft and said wheel support operable to oscillate the latter back and forth and maintain said line of contact fixed in different positions of said table.

3. A machine for forming spiral teeth of substantially constant lead on a longitudinally tapering rotary cutter, said machine having, in combination, a frame, a support thereon for a cutter to be sharpened, means on said support mounting said cutter for rotation about the cutter axis, a support carrying a rotatable grinding wheel for engagement of a peripheral surface thereon with the face of one of said cutter teeth, means mounting said supports for relative reciprocation along said cutter axis and for relative movement along a path extending transversely of the cutter axis, mechanism for effecting such reciprocation, for simultaneously turning the cutter about said axis, and for relatively moving said supports along said path in accordance with the changing helix angle and taper of the cutter tooth, means supporting said wheel support to swing about an axis coincident with the line of contact between said wheel and the engaged tooth face of said cutter, coacting cam and follower elements one mounted on the reciprocable support and the other on the frame of said machine, said cam element being inclined relative to the direction of said relative reciprocation, and a drive connection on said machine frame including a plurality of interconnected gear members actuated by said second element and actuating said wheel support to swing the same about said second axis so as to maintain said line of contact fixed in all positions of engagement between the wheel and tooth face.

4. A machine for forming spiral teeth of substantially constant lead on a longitudinally tapering rotary cutter, said machine having, in combination, a frame, a cutter support thereon, means on said support mounting said cutter for rotation about the cutter axis, a support carrying a rotatable grinding wheel for engagement of a peripheral surface thereon with the face of one of said cutter teeth, means mounting said supports on said frame for relative reciprocation along said cutter axis and for relative movement along a path extending transversely of the cutter axis, mechanism for effecting such reciprocation and simultaneously turning the cutter about said axis and for relatively moving said supports along said path in accordance with the changing helix angle and taper of the cutter tooth, means on said frame of said machine mounting one of said supports to swivel about an axis coincident with the line of contact between said wheel and the cutter tooth face being sharpened, a cam element having a surface inclined relative to the line of reciprocation of the movable support, a follower element engaging said cam surface, and means connecting said elements to said reciprocable support and machine frame and operable to transmit the cam motion to the swiveled support and turn the latter in synchronism with the reciprocations of the reciprocable support whereby to maintain said line of wheel contact fixed in all positions of engagement between the wheel and cutter tooth.

5. A machine for forming spiral teeth of substantially constant lead on a longitudinally tapering rotary cutter, said machine having, in combination, a stationary bed, a reciprocable table slidable back and forth thereon, means on said table mounting said cutter for rotation about the cutter axis, a support carrying a rotatable grinding wheel for engagement of a peripheral surface thereon with the face of one of said cutter teeth, means mounting said support for movement along a path extending transversely of the cutter axis, mechanism for reciprocating said table, simultaneously turning the cutter about said axis, and moving said support along said path, means on said bed supporting said table to swing about an axis coincident with the line of contact between said wheel and the engaged tooth face of said cutter, a cam element having a surface inclined relative to the line of reciprocation of the movable support, a follower element engaging said cam surface, and means connecting said elements to said table and machine bed and operable to transmit the cam motion to the table and turn the latter in synchronism with the reciprocations of the table whereby to maintain said line of wheel contact fixed in all positions of engagement between the wheel and cutter tooth.

6. A machine for forming spiral teeth of substantially constant lead on a longitudinally tapering rotary cutter, said machine having, in combination, a cutter support, means on said support mounting said cutter for rotation about the cutter axis, a support having a grinding wheel rotatably mounted thereon for engagement of a peripheral surface thereon with the face of one of said cutter teeth, means mounting said supports for relative reciprocation along said cutter axis, for relative movement along a path extending transversely of the axis, and for relative swiveling about a second axis extending transversely of said first axis coincident with the line of contact between said wheel and cutter surfaces, mechanism for effecting such reciprocation, a drive connection between the movable one of said supports and said cutter operable to turn the latter about said first axis, a drive connection for converting the reciprocatory movement between said supports into relative transverse movement of the two along said path to cause said wheel to follow the taper of said cutter, and a drive connection for converting the reciprocatory movements between said movable supports into said swiveling movement to maintain said wheel surface and the engaged cutter tooth tangent to each other and said line of contact fixed in all of the positions of the movable supports.

7. A machine for forming spiral teeth of substantially constant lead on a longitudinally tapering rotary cutter, said machine having, in combination, a cutter support, means on said support mounting said cutter for rotation about the cutter axis, a support having a grinding tool rotatably mounted thereon for engagement of a peripheral surface thereon with the face of one of said cutter teeth, means mounting said supports for relative reciprocation along said cutter axis, for relative movement along a path extending transversely of the axis, and for relative swiveling of the cutter and tool supports about an axis extending transversely of said first axis and coincident with the line of contact between said tool and cutter surfaces, mechanism for effecting such reciprocation, a driving connection operated by said relative reciprocatory movement to turn said cutter about said first axis and cause said tool to follow the spiral of the cutter tooth, a driving connection operated in timed relation to said reciprocatory movement and operable to relatively move said supports along said path and cause said tool surface to follow the taper of the cutter, and a driving connection actuated during said reciprocatory movement and operable to swivel said supports relative to each other about said second axis in accordance with the changing helix angle of the cutter tooth whereby to maintain said tool surface and the engaged tooth face in fixed tangential relation to each other at all points along the latter.

8. A machine for forming spiral teeth of substantially constant lead on a longitudinally tapering rotary cutter, said machine having, in combination, a cutter support, means on said support mounting said cutter for rotation about the cutter axis, a support having a grinding wheel rotatably mounted thereon for engagement of a peripheral surface thereon with the face of one of said cutter teeth, means mounting said supports for relative reciprocation along said cutter axis and for relative movement along a path extending transversely of the cutter axis, mechanism for effecting such reciprocation, simultaneously turning the cutter about said axis, and relatively moving said supports along said path in accordance with the changing helix angle and taper of the cutter tooth, means supporting said wheel support to swing about an axis coincident with the line of contact between said wheel and the engaged tooth face of said cutter, and a drive connection between the reciprocable support and said wheel support and operable to oscillate the latter progressively in directions and through distances such as to maintain said line of contact fixed in different positions of the reciprocable support in spite of changes in said helix angle.

9. A machine for forming spiral teeth of substantially constant lead on a longitudinally tapering rotary cutter, said machine having, in combination, a cutter support, means on said support mounting said cutter for rotation about the cutter axis, a support having a grinding wheel rotatably mounted thereon for engagement of a peripheral surface thereon with the face of one of said cutter teeth, means mounting said supports for relative reciprocation along said cutter axis and for relative movement along a path extending transversely of the cutter axis, mechanism for effecting such reciprocation, simultaneously turning the cutter about said axis, and for relatively moving said supports along said path, means supporting said wheel support to swing about an axis coincident with the line of contact between said wheel and the engaged tooth face of said cutter, and mechanism deriving motion from the reciprocation of said movable support to turn said swingable support about said second axis in accordance with changes in the helix angle of the cutter tooth engaging the wheel.

10. A machine for forming spiral teeth of substantially constant lead on a longitudinally tapering rotary cutter, said machine having, in combination, a cutter support, means on said support mounting said cutter for rotation about the cutter axis, a support having a grinding wheel rotatably mounted thereon for engagement of a peripheral surface thereon with the face of one of said cutter teeth, means mounting said supports for relative reciprocation along said cutter axis, for relative movement along a path extending transversely of the cutter axis, and for relative swiveling along an axis extending along the normal line of contact between the wheel surface and a face of the cutter tooth being ground, mechanism for reciprocating the movable support, and mechanism deriving motion from the reciprocation of the reciprocatory support and operable to simultaneously turn the cutter about said cutter axis and relatively move said supports along said path and about said second axis in accordance with the changing taper and helix angle of the engaged tooth face.

11. A machine for forming spiral teeth of substantially constant lead on a longitudinally tapering rotary cutter, said machine having, in combination, a cutter support, means on said support mounting said cutter for rotation about the cutter axis, a support having a grinding wheel rotatably mounted thereon for engagement of a peripheral surface thereon with the face of one of said cutter teeth, means mounting said supports for relative reciprocation along said cutter axis and for relative movement along a path extending transversely of the cutter axis, mechanism for effecting such reciprocation, simultaneously turning the cutter about said axis, and for relatively moving said supports along said path, means supporting said wheel support to swing about an axis coincident with the line of contact between said wheel and the engaged tooth face of said cutter, and mechanism for transmitting the reciprocatory motion of said movable support to said swingable support to turn the latter about said second axis in accordance with the changing helix angle of the cutter tooth engaging said wheel, said mechanism including a coupling disengageable to permit independent swinging of the swingable support and reengageable in different positions of the latter.

JAMES J. LUCAS.

REFERENCES CITED

The following references are of record in the file of this patent:

UNITED STATES PATENTS

| Number | Name | Date |
|---|---|---|
| 1,862,840 | Bullock et al. | June 14, 1932 |
| 1,870,764 | Aeppli | Aug. 9, 1932 |
| 2,048,462 | Orcutt | July 21, 1936 |
| 2,335,468 | Zwick | Nov. 30, 1943 |